United States Patent [19]

Moser et al.

[11] Patent Number: 4,676,210
[45] Date of Patent: Jun. 30, 1987

[54] AIR-COMPRESSING RECIPROCATING PISTON-EQUIPPED INTERNAL COMBUSTION ENGINE

[75] Inventors: Franz Moser, Steyr; Franz Rammer, Wolfern; Helmut Priesner, Steyr, all of Austria

[73] Assignee: Steyr-Daimler-Puch AG, Vienna, Austria

[21] Appl. No.: 858,967

[22] Filed: May 2, 1986

[30] Foreign Application Priority Data

May 2, 1985 [AT] Austria ................................ 1298/85

[51] Int. Cl.$^4$ ............................................. F02B 31/00
[52] U.S. Cl. ...................................... 123/301; 123/276; 123/279
[58] Field of Search .......................... 123/301, 276, 279

[56] References Cited

U.S. PATENT DOCUMENTS

| | | | |
|---|---|---|---|
| 2,959,161 | 11/1960 | Bottger et al. | 123/276 |
| 3,020,898 | 2/1962 | Hartmann | 123/276 |
| 4,108,116 | 8/1978 | Ohta | 123/276 |
| 4,207,843 | 6/1980 | List et al. | 123/276 |
| 4,338,898 | 7/1982 | Bauder et al. | 123/279 |
| 4,392,465 | 7/1983 | Wolters et al. | 123/276 |

Primary Examiner—Raymond A. Nelli
Attorney, Agent, or Firm—Marmorek, Guttman & Rubenstein

[57] ABSTRACT

An air-compressing reciprocating piston-equipped internal combustion engine comprises, in the frontal face of a piston head, a rotation-symmetrical cavity as a combustion chamber, a fuel-feeding unit generating a rotary motion of the air charge entering the cavity, and a fuel injection unit. The fuel injection unit is provided with an injection nozzle for injecting fuel directly into the cavity constituting the combustion chamber. In order to achieve a higher degree of efficiency, a decrease of the emission of polluting gases and of noise, as well as a relief of the mechanically highly stressed parts of the engine, the rotary motion of the air charge generated by the fuel-feeding unit is given a swirl number of about 1.5 to 2.5. Furthermore, the diameter (d) of the combustion chamber-constituting cavity is between about 55 to 75% of the diameter (D) of the cylinder, and finally, the fuel injection nozzle has at least four orifices.

5 Claims, 1 Drawing Figure

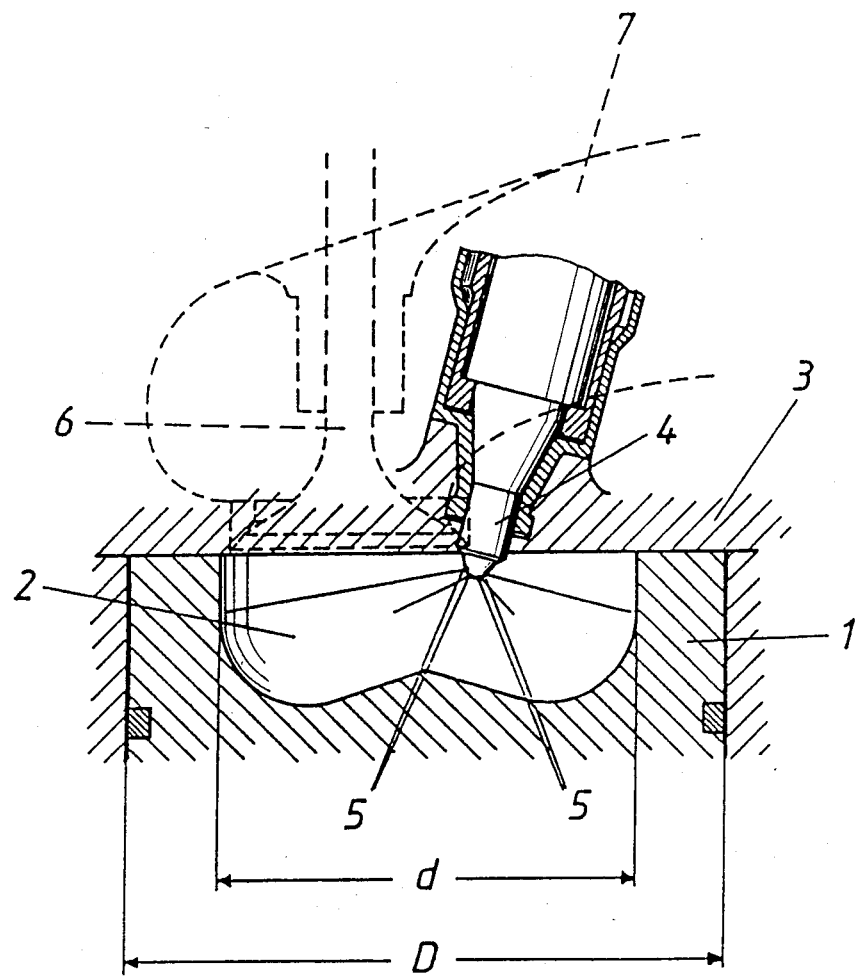

४,६७६,२१०

AIR-COMPRESSING RECIPROCATING PISTON-EQUIPPED INTERNAL COMBUSTION ENGINE

BACKGROUND OF THE INVENTION

The invention relates to an air-compressing reciprocating piston-equipped internal combustion engine comprising at least one piston having a piston head with a frontal face; per piston, a cylinder surrounding the piston head; a rotation symmnetrical cavity being disposed approximately centrally in the frontal face of the piston head and constituting a combustion chamber: a fuel injection unit comprising a fuel injection nozzle having at least four orifices and adapted for injecting fuel directly into the cavity; and an air-feeding unit adapted for generating a rotary motion of the air charge entering the cavity; wherein the diameter of the cavity amounts to at least 55% of the diameter of the aforesaid cylinder.

In the case of known internal combustion engines, the preparation of the air-fuel mixture in the cavity constituting the combustion chamber occurs preponderantly due to the rapid rotary motion of the air charge in the cavity. This leads to a disintegration of the injected fuel jet into relatively small-sized droplets which are intermingled with the air. In particular, when the injected fuel quantities are large, the movement of the air must be a very intense one if a sufficient preparation of the mixture is to be achieved in a sufficiently short time. For this reason, the diameter of the combustion chamber-constituting cavity is generally chosen to be relatively small, so that the air swirl generated in the cavity by the air-feeding unit can be maintained or even increased. This suffers, however, from the drawback that much of the energy needed for preparing the air-fuel mixture is required in the form of the kinetic energy of the rotating air, and, due to this generation of an air swirl, there results a reduction of the air charge filling the internal combustion engine. This has a disadvantageous influence on the optimal power yield of the engine and its freedom from smoke formation, in particular in the case of free-suction engines.

Moreover, the intense air-flow which prevails in part also during the combustion step, results in an intensified heat transfer at the piston and thereby in a higher thermic stress acting on this part of the engine. A further drawback resides in that the manufacture of the unit for generating the rotary motion of the air, such as, for example, a spiral inlet duct, a tangential duct or an inlet valve with deflector suffers from relatively large tolerances, whereby the swirl of the air charge can vary greatly from one cylinder to another, and/or from one engine to another, respectively. This may partly result in swirl values which are either too high or too low, this may lead to a deterioration of the smoke emission and also of the fuel consumption of the engine.

It is also known to build air-compressing reciprocating piston-equipped internal combustion engines without an air intake unit generating a rotary motion of the air charge. In this type of construction, the distribution of the fuel in the cavity constituting the combustion chamber takes place via a considerable number of orifices in the fuel injection nozzle; in some cases the nozzle has ten or more orifices. It is almost exclusively this specific design of the injection nozzle which serves to prepare the air-fuel mixture. Internal combustion engines of this last-mentioned type comprise combustion space-constituting cavities having a very large diameter and a relatively low depth, and must be equipped with fuel injection means which are capable of delivering fuel at very high pressures of about 1000 to 1300 bar, in order to achieve the preparation of the air-fuel mixture within a sufficiently short time, in particular when large amounts of fuel are to be injected.

Such internal combustion engines suffer from the drawback of an excessively large noise level, the emission of nitrogen oxides and mechanical stress exerted on the piston. Moreover, the high injection pressures of such fuel injection units which comprise injection lines between the pump and the nozzles cause considerably problems of stress resistance; that is why most of the engines of this type can be operated only with pumps and nozzles which have been combined in a single unit.

In another internal combustion engine which has been described in German Offenlegungsschrift No. 27 38 687, the diameter of the cavity serving as combustion chamber amounts more than 55% of the diameter of the cylinder. However, the cavity in this type of engine is of particularly great depth, and different impingement levels in the cavity are to be attained by greatly varying the directions of the various fuel jets emitted by the fuel injection nozzle, in order to have the fuel impinge on the walls of the combustion chamber as uniformly as possible. No provision is made for a specific swirl, and no specific data are given with regard to the fuel injection unit, especially, as the object is exclusively to attain the distribution of the fuel over different levels in the cavity. As a matter of fact, an increased swirl is to be permitted in this particular arrangement.

Finally, it is known from GDR Pat. No. 205,488 to reduce the rotary speed of the combustion air in the combustion chamber, such air being required to span, during the injection period pertaining to the rated power output, about 60 to 80% of the areal sector formed by the axes normal to the orifices of two vicinal fuel jets. However, such measure is impossible to control, because there exists at present no known method of determining the rotary motion of the air in a combustion chamber while the engine is running during operation. Moreover, this teaching is intended to be applied to stationary engines or to internal combustion engines having a greatly reduced range of operational r.p.m.'s, which also explains the disclosed narrowly limited speed range of the combustion air. In the case of vehicle engines which have to cover a broad range of speeds, this teaching would not lead to satisfactory results because, at higher operational speeds, there would unavoidably occur a spreading of the air over neighboring fuel jets, which would cause increased smoke emission and fuel consumption.

OBJECTS AND SUMMARY OF THE INVENTION

It is therefore a principal object of the invention to avoid all of the above-mentioned drawbacks and to improve the initially described internal combustion engine in a manner such that an increased power yield, a reduction of the emissions of smoke and gaseous off gas components, and a decrease of noise and relief for the mechanically highly stressed engine parts are attained.

This object and others will become apparent from the following description are attained, in combination, by the features of the rotary motion of the air charge operated by the air-feeding unit having a swirl number of from about 1.5 to 2.5, determined by the vane-type anemometer method (Flügelradverfahren), and of dimensioning the fuel injection unit for delivering fuel at a rate of 5 to 15 mm³ per degree of crank angle, and of providing for injection pressure of 500 to 1000 bar to prevail in the pressure chamber of the fuel injection nozzle.

This arrangement according to the invention is not very sensitive in respect of deviations of the swirl of the air charge, generated in the air-feeding unit, from a nominal swirl value, as the rotary motion of the air charge in the cavity serving as combustion chamber is slowed down. The reduction of the kinetic energy of the moving air charge caused by this slow-down results in a better output as well as a better charging of the internal combustion engine. All in all, the arrangement according to the invention distinctly reduces the noise level of the internal combustion engine compared with an engine lacking a swirl-generating air-feeding unit, while the mechanical and thermic stresses exerted especially on the piston are also substantially reduced. There is no need to apply any extremely high injection pressures, thus avoiding all disadvantages caused by them, and even when large amounts of fuel are injected the preparation of the air-fuel mixture is achieved within a short time so that a good engine output and low emission values can be achieved even in the case of high loads. Thanks to the relatively low injection pressures, problems of stress exerted on the fuel injection unit are avoided. The high feed rates and the stated fuel injection pressures, in combination with the very satisfactory preparation of the air-fuel mixture, afford very short injection periods so that the beginning of injection can be shifted relatively closely to the upper dead center of the piston, leading to a favorable output without delaying the end of injection in an unfavorable manner. Thereby, it is further made possible to decrease the emission of nitrogen oxides, the noise and the mechanical stresses exerted on the engine without having to put up with any detrimental effects as far as other off-gas components such as smoke or unburned hydrocarbons are concerned. Thanks to the short times required for fuel injection and preparation of the air-fuel mixture, it is possible to largely dispense with a jet-adjusting injection control unit; this means not only the achievement of considerably simplifying and/or reducing the technical expenditure, but also of decreasing the trouble incidence of the internal combustion engine.

In further developing the invention, there are devised in the injection nozzles four, four to six, or five to eight orifices, depending on whether the respective cylinder has a diameter of up to about 100 mm, or from about 100 to 130 mm, or more than 100 mm. This provides advantageously for a comparatively simple manufacture and controllability of the fuel injection nozzle, on the one hand, and for a satisfactory preparation of the air-gas mixture regardless of the fact that the same becomes more difficult with increasing diameters of the respective cylinder.

The vane-type anemometer method (Flügelradverfahren) for determining the swirl number has been described in "Oesterreichische Ingenieur-Zeitschrift" No. 9, (1965). It involves determining the speed of a vane-wheel disposed in a cavity constituting a combustion chamber in a model, and to calculate the swirl number from the aforesaid speed as well as from the crankshaft speed with the aid of a given mathematical equation.

BRIEF DESCRIPTION OF THE DRAWING

A preferred embodiment of parts of an internal combustion engine with air compressing reciprocating piston being essential features of the invention is illustrated schematically in axial sectional view in the single FIGURE of the accompanying drawing.

DETAILED DESCRIPTION OF THE EMBODIMENT SHOWN IN THE DRAWING

In the frontal face of the piston head 1 there is provided a cavity 2 serving as combustion chamber, whose diameter d amounts to about 70% of the piston diameter D. A fuel injection nozzle 4 which is mounted in the cylinder head 3 and injects fuel directly into the combustion chamber-constituting cavity 2 has at least four injection orifices 5. An air-feeding unit, constituted by an entry valve 6 and an inlet channel 7 of spiral configuration, is designed in a manner such that it generates a rotary motion of the charge of air entering the combustion chamber-constituting cavity 2.

We claim:

1. An air-compressing reciprocating piston-equipped internal combustion engine comprising at least one piston having a piston head with a frontal face; per piston, a cylinder surrounding said piston head; a rotation symmetrical cavity being disposed approximately centrally in the frontal face of said piston head and constituting a combustion chamber; a fuel injection unit comprising a fuel injection nozzle having a pressure chamber and at least four injection orifices and adapted for injecting fuel directly into said cavity; and an air-feeding unit adapted for generating a rotary motion in the air charge entering said cavity; wherein the diameter (d) of said cavity amounts to at least 55% of the diameter (D) of said cylinder, the rotary motion of the air charge generated by said air-feeding unit has a swirl number, determined by the vane-type anemometer method, of about 1.5 to 2.5; and said fuel-injection unit is dimensioned for affording a fuel delivery rate of from 5 to 15 mm³ per degree of crank angle, and injection pressures of 500 to 1000 bar prevailing in said pressure chamber of said injection nozzle.

2. The internal combustion engine of claim 1, wherein said cylinder has a diameter of at most 100 mm, and said fuel injection nozzle has four orifices.

3. The internal combustion engine of claim 1, wherein said cylinder has a diameter of above 100 and up to 130 mm inclusive, and said fuel injection nozzle has from four to six orifices.

4. The internal combustion engine of claim 1, wherein said cylinder has a diameter above 130 mm, and said fuel injection nozzle has from five to eight orifices.

5. The internal combustion engine of claim 1, wherein the diameter (d) of said cavity amounts to above 55% to about 75% of the diameter (D) of said cylinder.

* * * * *